United States Patent
Dumant et al.

(10) Patent No.: US 11,036,730 B2
(45) Date of Patent: Jun. 15, 2021

(54) BUSINESS INTELLIGENCE LANGUAGE TYPE REPRESENTING RESULT STRUCTURE

(71) Applicant: Business Objects Software Limited, Dublin (IE)

(72) Inventors: Bruno Dumant, Verneuil sur Seine (FR); Yannick Cras, Paris (FR)

(73) Assignee: Business Objects Software Limited, Dublin (IE)

( * ) Notice: Subject to any disclaimer, the term of this patent is extended or adjusted under 35 U.S.C. 154(b) by 250 days.

(21) Appl. No.: 15/383,058

(22) Filed: Dec. 19, 2016

(65) Prior Publication Data

US 2018/0173750 A1 Jun. 21, 2018

(51) Int. Cl.
| | | |
|---|---|---|
| *G06F 16/00* | (2019.01) | |
| *G06F 16/242* | (2019.01) | |
| *G06Q 10/06* | (2012.01) | |
| *G06F 16/248* | (2019.01) | |
| *G06F 16/2455* | (2019.01) | |

(52) U.S. Cl.
CPC ........ *G06F 16/2448* (2019.01); *G06F 16/248* (2019.01); *G06F 16/2455* (2019.01); *G06Q 10/063* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,813,002 A | * | 9/1998 | Agrawal | G06F 16/00 |
| 6,781,961 B1 | * | 8/2004 | Gunsay | H04L 45/00 |
| | | | | 370/255 |
| 8,190,620 B2 | * | 5/2012 | Dumant | G06T 11/206 |
| | | | | 707/754 |
| 8,572,122 B2 | * | 10/2013 | Cras | G06F 16/2455 |
| | | | | 707/791 |
| 9,547,646 B2 | * | 1/2017 | Ghaemi | G06F 16/24578 |
| 9,836,501 B2 | * | 12/2017 | Robichaud | G06F 16/2372 |
| 10,180,977 B2 | * | 1/2019 | Fisher | G06F 16/2379 |
| 10,185,708 B2 | * | 1/2019 | Miller | G06F 16/2372 |
| 10,203,842 B2 | * | 2/2019 | Miller | G06F 16/33 |
| 10,204,093 B2 | * | 2/2019 | Miller | G06F 16/24544 |
| 10,204,132 B2 | * | 2/2019 | Miller | G06F 17/30551 |
| 10,235,418 B2 | * | 3/2019 | James | G06F 17/30551 |
| 2006/0206512 A1 | * | 9/2006 | Hanrahan | G06T 11/206 |
| 2008/0244416 A1 | * | 10/2008 | Dumant | G06F 8/38 |
| | | | | 715/744 |
| 2009/0100086 A1 | * | 4/2009 | Dumant | G06T 11/206 |

(Continued)

*Primary Examiner* — Farhan M Syed
(74) *Attorney, Agent, or Firm* — Buckley, Maschoff & Talwalker LLC (57) ABSTRACT

According to some embodiments, a business intelligence data store contains semantic layer information. A business intelligence language platform may receive a business intelligence language query expression from a user. The business intelligence language platform may then access the mapping information in the business intelligence model data store to compute an output type describing a result structure entity for the query expression. According to some embodiments, the output type may be used to automatically recommend at least one visualization chart to the user. Moreover, in some embodiments the output type is annotated with meta-data information about a business object.

15 Claims, 9 Drawing Sheets

(56) References Cited

U.S. PATENT DOCUMENTS

| | | | | |
|---|---|---|---|---|
| 2011/0295837 A1* | 12/2011 | Bolsius | ................. | G06F 16/245 |
| | | | | 707/714 |
| 2011/0295870 A1* | 12/2011 | Bolsius | ................. | G06Q 10/10 |
| | | | | 707/765 |
| 2012/0221553 A1* | 8/2012 | Wittmer | ................. | G06F 16/26 |
| | | | | 707/722 |
| 2013/0173591 A1* | 7/2013 | Cras | .................... | G06F 16/2455 |
| | | | | 707/718 |
| 2015/0331928 A1* | 11/2015 | Ghaemi | ............. | G06F 16/2457 |
| | | | | 707/602 |
| 2016/0217371 A1* | 7/2016 | Leithiser | .................. | G06F 16/28 |
| 2016/0224532 A1* | 8/2016 | Miller | .................... | G06F 16/22 |
| 2017/0118308 A1* | 4/2017 | Vigeant | .................... | H04N 7/15 |
| 2017/0235436 A1* | 8/2017 | Hooton | ................ | G06F 3/0486 |
| | | | | 705/7.11 |
| 2018/0121497 A1* | 5/2018 | Robichaud | ............. | G06Q 10/00 |
| 2019/0155802 A1* | 5/2019 | Miller | ................. | G06F 16/3334 |
| 2019/0155803 A1* | 5/2019 | Miller | .................... | G06F 16/26 |
| 2019/0155804 A1* | 5/2019 | Miller | .................... | G06Q 10/00 |

\* cited by examiner

BUSINESS INTELLIGENCE LANGUAGE TYPE REPRESENTING RESULT STRUCTURE

FIELD

Some embodiments are associated with a business intelligence language for an enterprise. In particular, some embodiments describe a business intelligence language type system for result sets and visualizations.

BACKGROUND

In some cases, a user might want to receive business information about an enterprise. For example, a user might want to create a query to view and/or analyze information from an enterprise data store about the enterprise's revenue or profit in accordance with various regions, time periods, products, etc. Query languages, such as the Structured Query Language ("SQL"), may be particularly suited for retrieval of data from data stores, regardless of the schema of the data. However, SQL may not be particularly suited to data analysis, as it lacks the expressiveness to specify complex, high-level calculations. For example, SQL may provide calculation of only one table at a time and lack constructs such as calculated members, join abstraction, and the abstraction of aggregation functions.

In contrast, Multi-Dimensional eXpressions ("MDX") is a language providing more meaningful multi-dimensional analytical queries including calculated measures, calculated members, hierarchical navigation support, and heterogeneous member sets. MDX is therefore commonly used to provide advanced analysis.

MDX, however, requires an underlying multi-dimensional model (i.e., an information Cube) which must be authored so as to conform to particular structural requirements. Typically, an information Cube represents a set of independent coordinates in an N-dimensional space, each point of which contains a scalar value (i.e., a string or numeral). MDX allows programmers to specify sets of coordinates in this space and to retrieve the values corresponding to the coordinates.

Authoring a Cube on top of, for instance, a transactional data model of an application can be a relatively costly design task which forces designers to make compromises. For example, a designer may typically determine a default hierarchy to navigate each dimension of a Cube. Also, all dimensions in a Cube must be orthogonal, and, as a result, relations that exist between dimensions in the original schema may be lost after the original schema is projected onto a Cube schema.

Note that data analysis often requires the specification of complex pieces of data, such as an entire report or a dashboard, that can only be materialized in a complex database schema containing, for instance, multiple fact tables sharing some but not all dimension tables. However, SQL, MDX, and other existing query languages for query and analysis are limited in regards to the "shape" of the data sets that a query can return. An SQL SELECT statement, however complex, always computes a single table. Similarly, an MDX statement always brings back a "cube slice" or star schema that includes only one fact table with foreign keys to zero or more independent dimension tables.

Therefore, if a report or dashboard requires more than the above-described simple data topologies, multiple queries to the underlying system must be issued. Then, the client application must reconcile the data returned by the multiple queries, which may involve additional data processing. Consequently, the atomicity of the read transaction is not guaranteed. In addition, the creation and understanding of queries in such approaches can be a difficult and error-prone task that requires specialized training and experience to be successful.

Being able to retrieve data of an entire dashboard made of multiple charts and tables in one request may be both more efficient and easier to manage. However, such an approach may impose a requirement that a clear contract exists to let a client consume returned data in a non-ambiguous way. According to some embodiments described herein a business language type system may be used for such a purpose, because it faithfully represents the structure of the data returned by the query. Similarly, some embodiments described herein might try to recommend an appropriate representation for the results of a query. For example, if a query returns revenue values per country, it could be interesting to represent the values on a map (instead of, for example, on a bar chart). The algorithms used to recommend an appropriate chart may use, according to some embodiments, structural information (such as a number of axes and their cardinality) together with semantic information (describing the nature of the presented information) to perform this task. Here again, the type of an expression may be helpful because it provides all of the needed the structural information (and may, in some cases, be annotated with semantic information). As a result, even before executing a query, such an algorithm can use type information to recommend appropriate representations for the result of that particular query. It may therefore be desirable to provide systems and methods to facilitate use of a business intelligence language type system in an intuitive and flexible manner.

SUMMARY OF THE INVENTION

According to some embodiments, systems, methods, apparatus, computer program code and means are provided to facilitate use of a business intelligence language type system in an intuitive and flexible manner. In some embodiments, a business intelligence model data store contains semantic layer information. A business intelligence language platform may receive a business intelligence language query expression from a user and access the mapping information in the business intelligence model data store to compute an output type describing a result structure entity for the received business intelligence language query expression. According to some embodiments, the output type is used to automatically recommend at least one visualization chart to the user. In some embodiments, the output type is annotated with meta-data information about a business object Some embodiments comprise: means for receiving, at a business intelligence language platform, a business intelligence language query expression from a user; means for accessing semantic layer information in a business intelligence model data store to compute an output type describing a result structure entity for the received business intelligence language query expression. Some embodiments further comprise means for using the output type to automatically recommend at least one visualization chart to the user. Still other embodiments include means for annotating the output type with meta-data information about a business object.

In some embodiments, a communication device associated with a back-end application computer server exchanges information with remote user devices. The information may be exchanged, for example, via public and/or proprietary communication networks.

Technical effects of some embodiments of the invention are improved and computerized ways to facilitate use of a business intelligence language type system in an intuitive and flexible manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

Some embodiments described herein are directed to a Business Intelligence Language ("BIL") system. The BIL system might leverage concepts present in the Data Specification Language ("DaSL") as described in U.S. Pat. No. 8,572,122, the contents of which are incorporated by reference herein for all purposes. BIL and/or DaSL may, for example, let a business user create powerful and flexible queries of an underlying data source.

Figure 1:
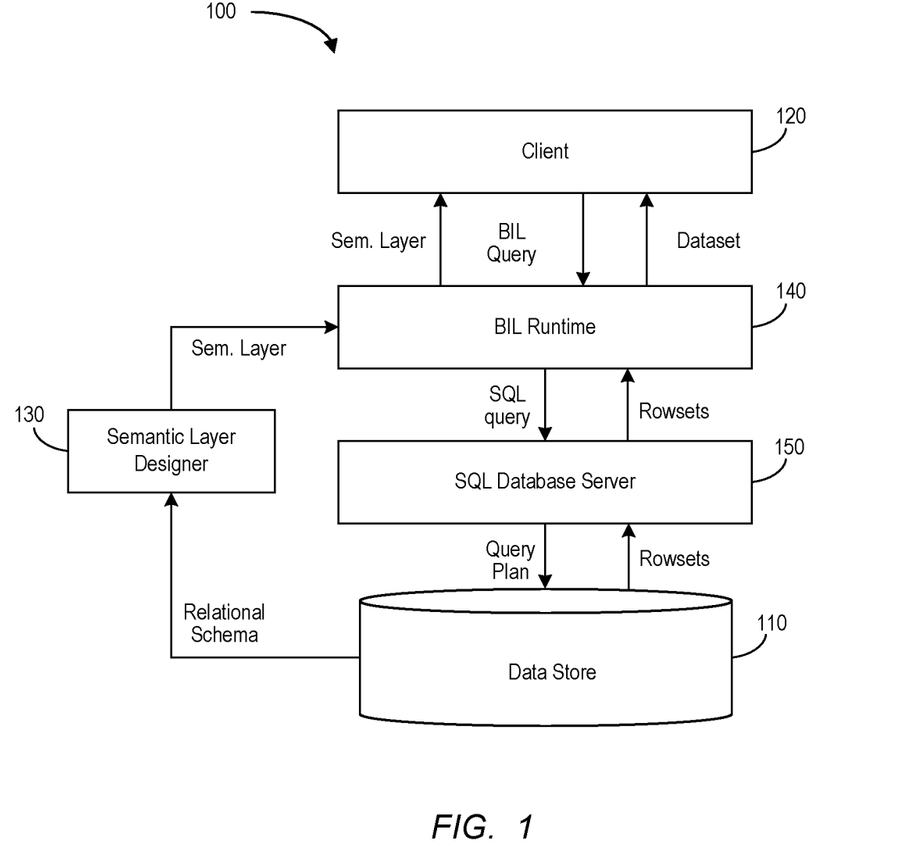
FIG. 1 is block diagram of a system.

FIG. 1 is a block diagram of system 100 as is known in the art. The system 100 may operate to provide data from data store 110 to client 120, and is described herein to provide contrast with the operation of some embodiments. As illustrated, semantic layer designer 130 determines the relational schema of data stored in data store 110. Semantic layer designer 130 maps logical entities of the relational schema to a set of abstract entities known as business objects. The business objects and their mappings comprise a semantic layer, which is defined in metadata of BIL runtime 140. The BIL runtime 140 may use semantic layer information and the data foundation (or data model) to translate a BIL query into native queries and to process the results. Note that the BIL runtime 140 may correspond to a BIL expansion element, a BIL compilation element, and/or a data source.

The business objects may represent business entities, such as customers, time periods, financial figures, etc. Business objects may be classified as dimensions along which one may want to perform an analysis or report (e.g., Year, Country, Product), details (additional information on dimensions, e.g., Address of a Customer or Description of a Product), and measures (e.g., Sales, Profit) whose values can be determined for a given combination of dimension values.

Client 120 comprises a computing device executing a front-end software application providing reporting, planning and/or analytics. Client 120 receives the semantic layer and generates business intelligence language queries based on the business objects of the semantic layer. Note that in some cases, a client may have no knowledge of the semantic layer and instead let the backend generate appropriate queries. This might be the case, for example, in smart BI where a client simply issues a near-natural query to the backend. The semantic layer therefore facilitates the retrieval of data from data store 110 without requiring reference to specific physical entities (tables, rows, etc.) of data store 110.

The BIL runtime 140 receives a BIL query from client 120 and creates a calculation plan based on the mappings which bind the semantic layer to the logical entities of the relational schema of data store 110 (sometimes named data foundation or data model). The calculation plan mixes local computations with zero, one, or more SQL queries. The queries may depend on each other, in the sense that a given query can information provided as the result of another query. The calculation plan defines in which order local computations and SQL queries should be executed (or if they can be executed in parallel). The BIL runtime 140 sends each SQL query to the SQL database server 150 and performs local computations according to the calculation plan. SQL database server 150 receives the corresponding SQL queries and, based on its knowledge of the relational schema and its underlying physical entities, creates query plans to be executed by data store 110. The data store 110 executes the query plans and returns corresponding rowsets (i.e., data) to the BIL runtime 140. Once the calculation plan is completely executed, the BIL runtime 140 formats the included data based on the semantic layer, and provides the thusly-formatted dataset to client 120.

Embodiments are not limited to relational schemas as described in the example of system 100. The schema of the underlying data store could be relational, multi-dimensional or another type, and a Data Schema may be generated therefrom for use by an adapter, compiler and client as described above. In this regard, elements 130 provide the BIL runtime 140 with metadata binding the Data Schema to logical entities of the underlying logical schema of data store 110; this element might not be required if the bindings are otherwise available to the BIL runtime 140. If the data store 110 is not a SQL data store, another query language (instead of SQL queries) may be used as appropriate.

As used herein, the term "BIL" may refer to, for example, a Business Intelligence ("BI") query representation model that can be easily be authored directly or indirectly by programmers who are not BI or database experts. Moreover, a BIL system may refer to business objects, types, functions and/or entities exposed by a knowledge graph and may specify arbitrarily simple or complex business questions that combine these BI entities. According to some embodiments, a BIL system may provide all required information explicitly without needing to rely on default or convention-based interpretations. Further, some embodiments may not require technical understanding of the data sources and their nature by a user (e.g., the use of database specific terms may be avoided) and may also be independent from the number and nature of the underlying data-source(s). Embodiments may target expressiveness while offering less abstract and granular constructs as compared to DaSL. Further, some embodiments may be compiled efficiently to a sufficient abstract relational plan.

According to some embodiments, a BIL system may compute arbitrary result set topologies such that BIL queries form a recursively nested structure of "bodies" attached to "axes" (which may allow for various topologies). A BIL system may also provide conceptual sparsity such that BIL is based on a relatively small number of primitive concepts that are re-used systematically. Some embodiments may avoid syntactic sugar and redundancy (e.g., "helpers," if any, may be added with caution and be identified as such). A BIL system may also provide re-entrance/orthogonality such that BIL is a fully recursive representation. According to some embodiments, any BIL entity can be used as a parameter for any BiL primitive or operation. The semantics of a BIL operator may be independent both from its parameters and from its syntactic context. Note that BiL may compute arbitrarily nested sub-queries as a core mechanism.

As used herein, the phrase "BIL query" may refer to, for example, a top-level artifact that specifies a business question. A BIL query may be considered "stand-alone" in the sense that it contains all the information necessary to uniquely define the semantics of a query. However, in itself the query might not contain the technical metadata needed to generate a physical query: this metadata can either be passed from the client inside a nesting payload (of which BIL is just a component), or acquired separately by a query service.

A BIL query may be called a "BIL expression" because the details of how an answer to a business question is computed might not matter to an author. What might matter instead is that a business question is asked and a business answer is returned. The actual answer computation may involve physical queries being issued to one or several data sources, and may also involve local calculations within the query service (or even in the client). A BIL expression may be a recursive structure, and may contain nested BIL expressions (which are composed using various operations). A BIL query may then be considered a top-level, outermost BIL expression that must be computed.

A BIL expression itself may be a declarative, recursive structure that specifies the business question to be answered. The semantic information may be precise and explicit. This expression might be, for example, serialized as a Java Script Object Notation ("JSON") structure. According to some embodiments, the JSON structure may be associated with an open-standard format that uses human-readable text to transmit data objects consisting of attribute—value pairs. In this case, the basic JSON data types are: (i) Number: a signed decimal number that may contain a fractional part and may use exponential E notation, but cannot include non-numbers; (ii) String: a sequence of zero or more Unicode characters delimited with double-quotation marks; (iii) Boolean: either of the values "true" or "false;" (iv) Array: an ordered list of zero or more values, each of which may be of any type (note that arrays may use square bracket notation with elements being comma-separated); (v) Object: an unordered collection of name/value pairs where the names (also called keys) are strings; and (vi) null: an empty value, using the word null.

The result of an evaluation of a BIL expression is called a BIL entity. The BIL entity is the answer to the business question specified by the BIL expression. Conversely, a BIL expression is also called a BiL entity definition. The output type or shape of a BIL expression may specify the schema of the corresponding BIL entity. The output type can be deduced from the definition even before (or without) computing the actual data. A client tool can obtain the output type of a BiL expression and use it, for instance, to bind views or controls on certain columns. The result set of a BIL expression may be a representation of the corresponding BIL entity. The result set may be computed when the BIL query is run and may comprise a set of tuple-sets of which the signatures match the query's output type (it may be obtained, for example, as a set of JSON flows).

According to some embodiments, a BIL entity generalizes the notion of entity set in Entity Relationship ("ER") model or tuple set in relational algebra. Similar to an entity that has named attributes or a table that has named columns, a BIL entity may have named properties (also sometimes referred to as attributes). Note however, that a property of a BIL entity is itself an arbitrary entity, so BI entities can be arbitrarily nested. An atomic entity is a value of a primitive type like a string or number, which doesn't nest any property; any other entity is a structured entity. In a "flat" entity, like a traditional entity set or SQL table, all properties are atomic entities. It is possible, for example, to flatten any entity into a tuple collection. Many operations in BIL may use flat entities, which are implicitly obtained from an entity through flattening.

The BIL entity may also generalize the notion of "key." In relational algebra or in the ER model, a tuple set or entity set usually has a unique key, a subset of its columns for which a value determine a unique value for each of the other columns, called dependent columns. A BIL entity also has a set of key properties, usually called axes, and a set of dependent properties called bodies. But in addition, a BIL Entity may specify an arbitrary number of functional dependencies or partial key constraints, also called axis attachments. Each body property may be attached to a subset of the entity's axes. Each value of a (body) property is determined by a specific combination of values for the axis properties to which it is attached. This makes it possible for an entity to represent heterogeneous data sets, for instance a table alongside with a summary value, or a cross table with additional information about its lines and columns, using a simple, systematic and re-entrant model. An entity or tuple set may be described by a type or signature, which specifies the names and data types of its attributes or columns. The output type of a BIL entity generalizes this notion: the output type specifies the names of this entity's properties, the axis attachment relationships between them, and (recursively) the output type of each nested structured component.

The Result Set of a BIL expression may be a stand-alone, self-described JSON structure that represents the entity data. According to some embodiments, there are three ways of returning this data: (1) the system may materialize the result set as a relational schema, where each axis attachment maps to a table with a foreign key to each of its (nesting) axes; (2) the system may create a recursively nested structure, in a more OLAP fashion, where the data for each nested "body" entity is given for each combination of values for the axes that drive it; or (3) the system may return a single flattened, de-normalized result set.

Figure 2:
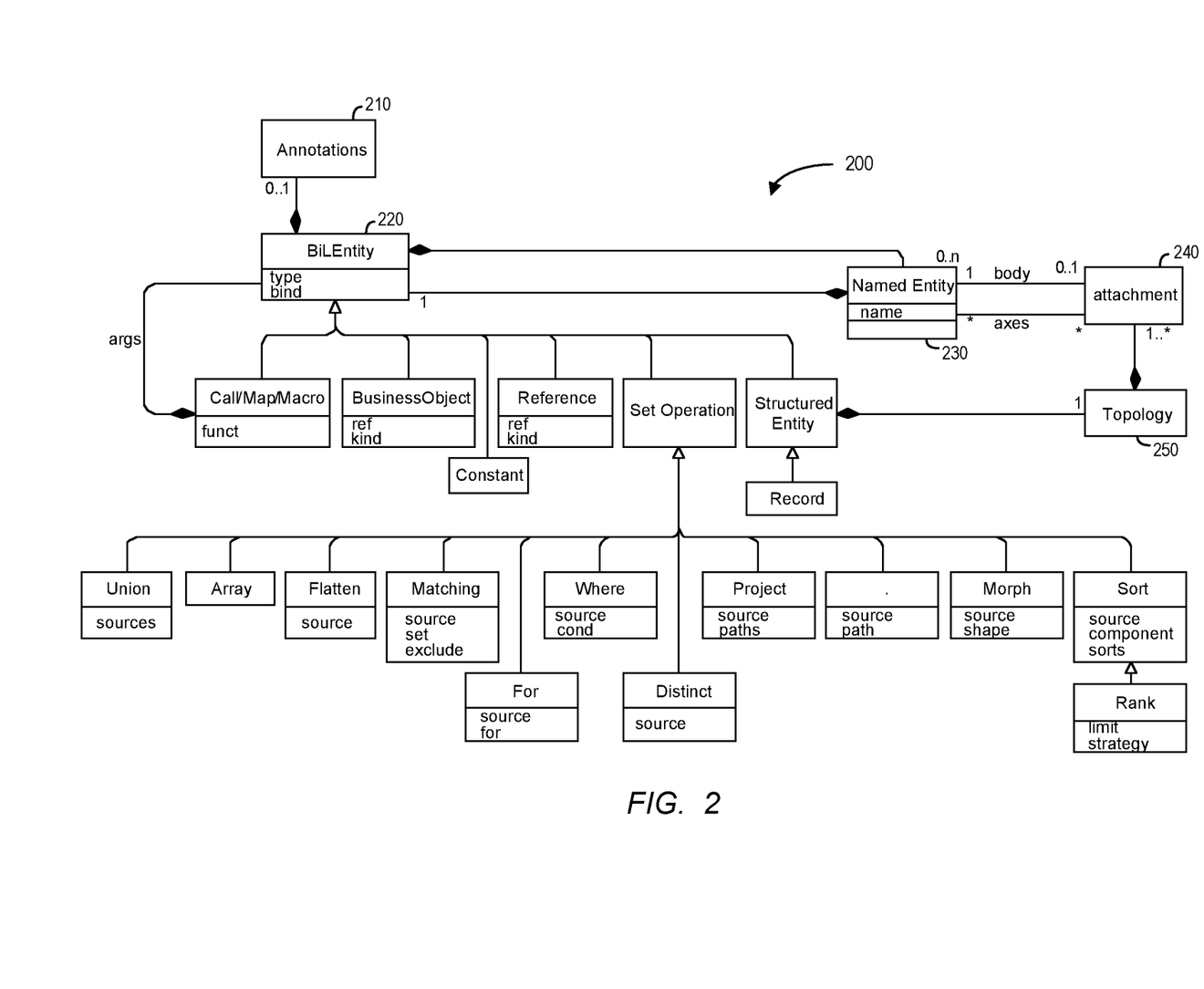
FIG. 2 is a system diagram summarizing structures and types of business intelligence language expressions in accordance with some embodiments.

FIG. 2 is a system diagram 200 summarizing structures and types of business intelligence language expressions in accordance with some embodiments. In particular, the diagram 200 illustrates BIL expression associations with annotations 210, a BIL entity 220, named entity 230, attachment 240, topology, etc. Note that a BIL expression might comprise a recursive JSON structure. The BIL expression may specify (in a general case) a dependency graph (e.g., a Directed Acyclic Graph ("DAG")) of BIL expressions, that are combined through various operations to finally produce a top-level BI entity. Note that a BI expression may specify an operation to be applied on zero or more other BIL entities. Moreover, a BI expression may specify a type property, which represents the operation performed to obtain the BiL entity, such as:

```
{
    "type": "call",
    //...
}
```

Further note that other properties of a BIL expression, specific to the associated type, may also be required.

According to some embodiments, a BIL expression has a map of nested expressions, each associated to a locally unique name. A nested expression can appear as a component in the expression's topology, and may also be used for calculations defined inside the expression. It may, for example, be necessary to give a name to an expression that is computed several times (possibly in different contexts) to produce the resulting entity. Nested expressions of an expression may be declared using a reserved property dictionary. The dictionary property may, for example, contain a map of named nested expressions. All expressions defined in the dictionary of an expression might be referred using the appropriate full or partial qualified name.

Figure 3:
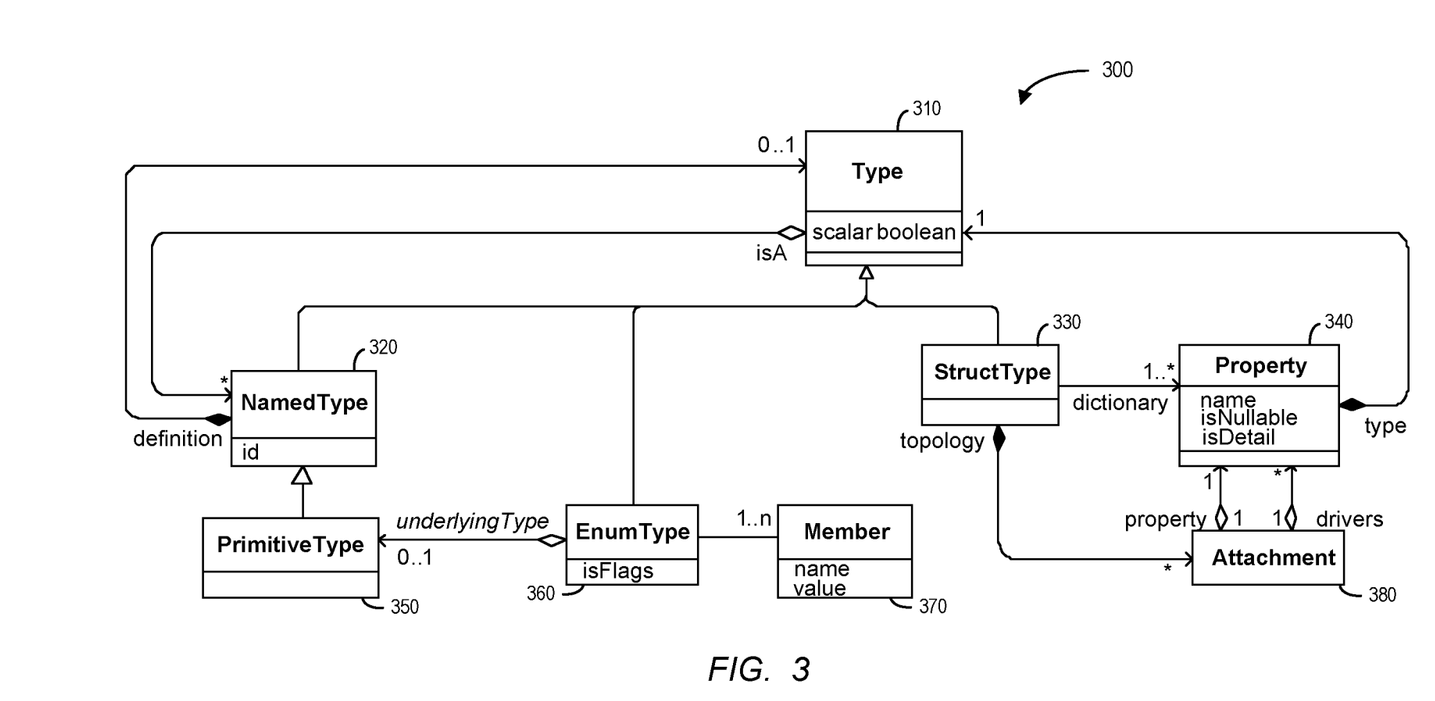
FIG. 3 is system diagram representing business intelligence language expression output types according to some embodiments.

Note that an output type of a BIL expression may describe the structure of a corresponding entity (that is, the structure of the information it represents). For example, FIG. 3 is system diagram 300 representing business intelligence language expression output types according to some embodiments. The diagram 300 illustrates relationships between an output type 310, named type 320, structure type 330 (e.g., containing information about functional dependencies between properties), property 340, primitive type 350 (e.g., Boolean, date, number, integer, string, etc.), enumerated type 360, member 370, attachments 380 (e.g., associated with drivers that are a collection of properties of a defined structure type), etc. Note that the output type 510 might be associated with scalar (e.g., when "scalar" equals false, each instance of the type is a collection of objects of the corresponding scalar type) or isA (all properties of a super-type may also be properties of the derived type), etc.

According to some embodiments, a macro function may be used to facilitate building complex queries. Note that to completely leverage such a capability, a way of encapsulating subqueries and reuse may be implemented. As used herein, the term "macro" may refer to, for example, a rule or pattern that specifies how a certain input sequence (often a sequence of characters) should be mapped to a replacement output sequence (also often a sequence of characters) according to a defined procedure. The mapping process that instantiates (transforms) a macro use into a specific sequence is known as macro "expansion." Macros may, for example, make a sequence of computing instructions available to a programmer as a single program statement, making the programming task less tedious and less error-prone. Specifically, an objective of "macros" is to encapsulate possibly parameterized BIL expressions to let the user express needs in a natural fashion, in particular when the effective calculation involves technical axes. Available macro definitions may be stored in a knowledge graph as JSON expressions. A macro definition may specify, for example, a name of the macro (used for search and display purposes); named parameters to be provided, if any, and the associated kind; a BIL expression, extended with the term "macroPlaceholder" (e.g., pseudo-expressions that will be replaced by the parameter values at runtime).

For instance, the following JSON could be used as the definition of the macro "Ratio":

```
{
    "name": "Ratio",
    "params": {
        "divisor" : { "kind" : "entity" },
        "dividend" : { "kind" : "entity" }
    },
    "expression": { "type": "call", "funct": "IF_THEN", "args": [
        { "type": "call", "funct": "!=", "args": [
            { "type": "macroPlaceholder", "name": "divisor" },
            ( )
        ]},
        { "type": "call", "funct": "/", "args": [
            { "type": "macroPlaceholder", "name":
            "dividend" },
            { "type": "macroPlaceholder", "name": "divisor" }
        ]}
    ]}
}
```

Macros can be used, according to some embodiments, in a BIL expression by using expressions of type "macro." If a user wants to compute revenue ratio per customer, he or she might use the following expression:

```
{ "type": "struct",
    "topology": { "r": { "a": true } },
    "dictionary": {
        "r": { "type": "macro", "macro": "com.sap.sbi.macros.Ratio",
        "args": {
            "dividend": { "type": "ref", "ref": [ "revenue" ] },
            "divisor": { "type": "ref", "ref": [ "revenue" ], "kind":
            "absolute" }
        }},
        "a" : { "type": "bo", "ref": "Customer" },
        "revenue": { "type": "bo", "ref": "Revenue" }
    }
}
```

Note that the macro may be invoked by using its knowledge graph identifier, not its name. According to some embodiments, the name can be used to create captions. Note that macros do not necessarily need arguments. For instance, a user might define "myCustomers" as follows:

```
{
    "name": "myCustomers",
    "params": { },
    "expression": { "type": "matching",
        "source": { "type": "bo", "ref": "Customer" },
        "set": [ "Coca-Cola", "Pepsi" ]
    }
}
```

In this way, it may be possible to define synonyms in a relatively straightforward fashion.

Figure 4:
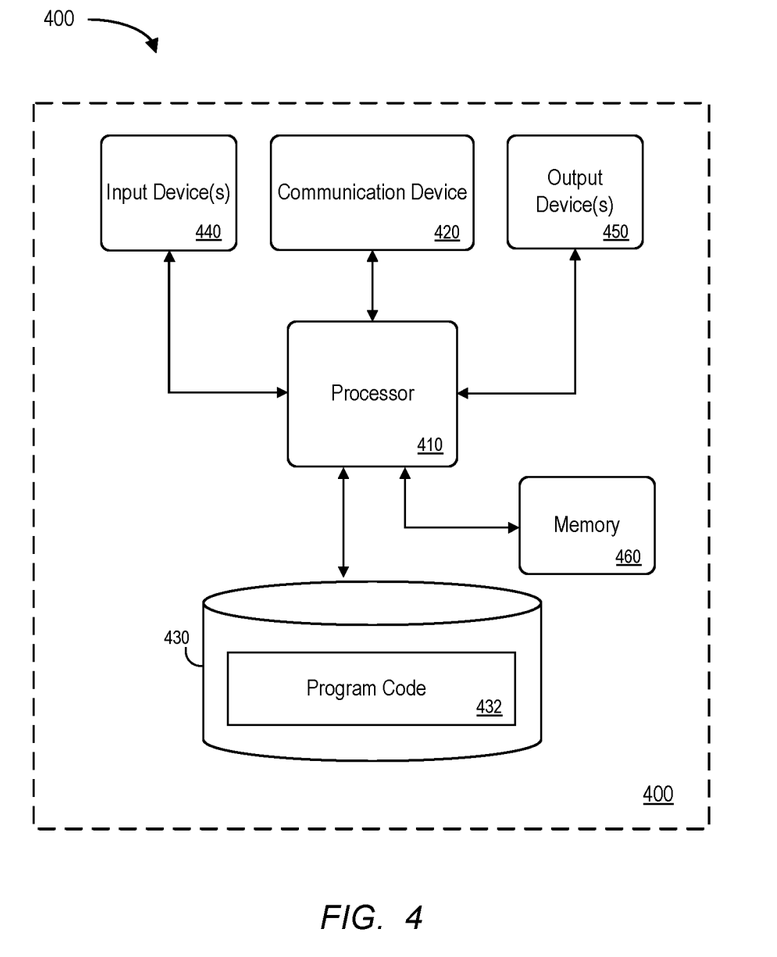
FIG. 4 is a high level diagram of an apparatus or platform according to some embodiments.

FIG. 4 is a block diagram of apparatus 400 according to some embodiments. The apparatus 400 may comprise a general-purpose computing apparatus and may execute program code to perform any of the functions described herein. The apparatus 400 may include other unshown elements according to some embodiments.

According to some embodiments, the apparatus 400 includes a processor 410 operatively coupled to a communication device 420, a data storage device 430, one or more input devices 440, one or more output devices 450, and/or a memory 460. The communication device 420 may facilitate communication with external devices, such as a reporting client, or a data storage device. The input device(s) 440 may comprise, for example, a keyboard, a keypad, a mouse or other pointing device, a microphone, knob or a switch, an Infra-Red ("IR") port, a docking station, and/or a touch screen. The input device(s) 440 may be used, for example, to enter information into apparatus 400 (e.g., a search term used to locate a BIL macro or business object). The output device(s) 450 may comprise, for example, a display (e.g., a display screen) a speaker, and/or a printer (e.g., to provide BiL results to a user, summary reports, troubleshooting information, etc.).

The data storage device 430 may comprise any appropriate persistent storage device, including combinations of magnetic storage devices (e.g., magnetic tape, hard disk drives and flash memory), optical storage devices, Read Only Memory ("ROM") devices, etc., while the memory 460 may comprise Random Access Memory ("RAM").

The program code 432 may be executed by the processor 410 to cause the apparatus 400 to perform any one or more of the processes described herein. Embodiments are not limited to execution of these processes by a single apparatus. The data storage device 430 may also store data and other program code for providing additional functionality and/or which are necessary for operation thereof, such as device drivers, Operating System ("OS") files, etc.

Note that in some languages, a query expression might map directly to a structure of the results. While this might limit the expressivity of such languages, it may make the consumption of results relatively straightforward (as well as the adaption of the query structure for various visual charts). According to some embodiments described herein, a business intelligence language may be provided with a substantial degree of composability of various operators. As a result, it may be much more difficult to understand the structure of computed information to recommend charts, user result sets, etc.

Figure 5:
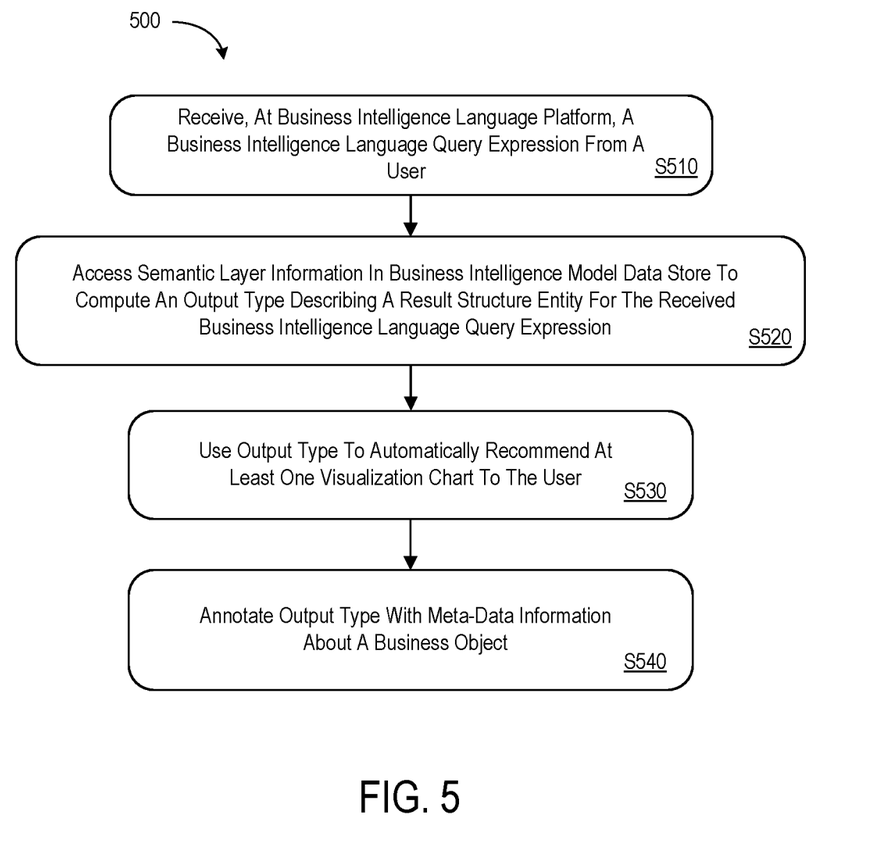
FIG. 5 illustrates a business intelligence language type system method in accordance with some embodiments.

FIG. 5 illustrates a business intelligence language type system method 1400 in accordance with some embodiments. At S510, the system may receive, at a business intelligence language platform, a business intelligence language query expression from a user. At S520, the system may access semantic layer information in a business intelligence model data store to compute an output type describing a result structure entity for the query expression. Note that the output type is may be associated with, for example, a named type, a structure type, a property, a primitive type, a member, and/or an attachment.

At S530, the output type may be used to automatically recommend at least one visualization chart to the user. For example, the automatically recommended visualization chart might be associated with a map or a timeline. According to some embodiments, the automatically recommended visualization chart is based at least in part on a number of axes, a number of measures, dependencies, cardinality of axes, semantic information, geographic information, and/or time information.

At S540, the output type may be annotated with meta-data information about a business object. For example, the annotation might be associated with semantic information, a unit for a measure, a label, an identifier, a location, an axis cardinality, etc.

In some embodiments, a data model data store may contain data foundation information, and information in the data model data store may be used to determine a native query, corresponding to the received business intelligence language query expression, to a data store database. The system may then retrieve, by a business intelligence language result set manager, data from the data source database responsive to the native query. The system may also output a business intelligence language result set, structured in accordance with the result structure entity described by the output type, to the user in response to the query expression. Note that the result set might be built from the output type in tabular form. Moreover, the output type may be associated with a plurality of linked type components, and each component may be provided by a single table. According to some embodiments, a single component may drive several tables associated with the output type.

Figure 6:
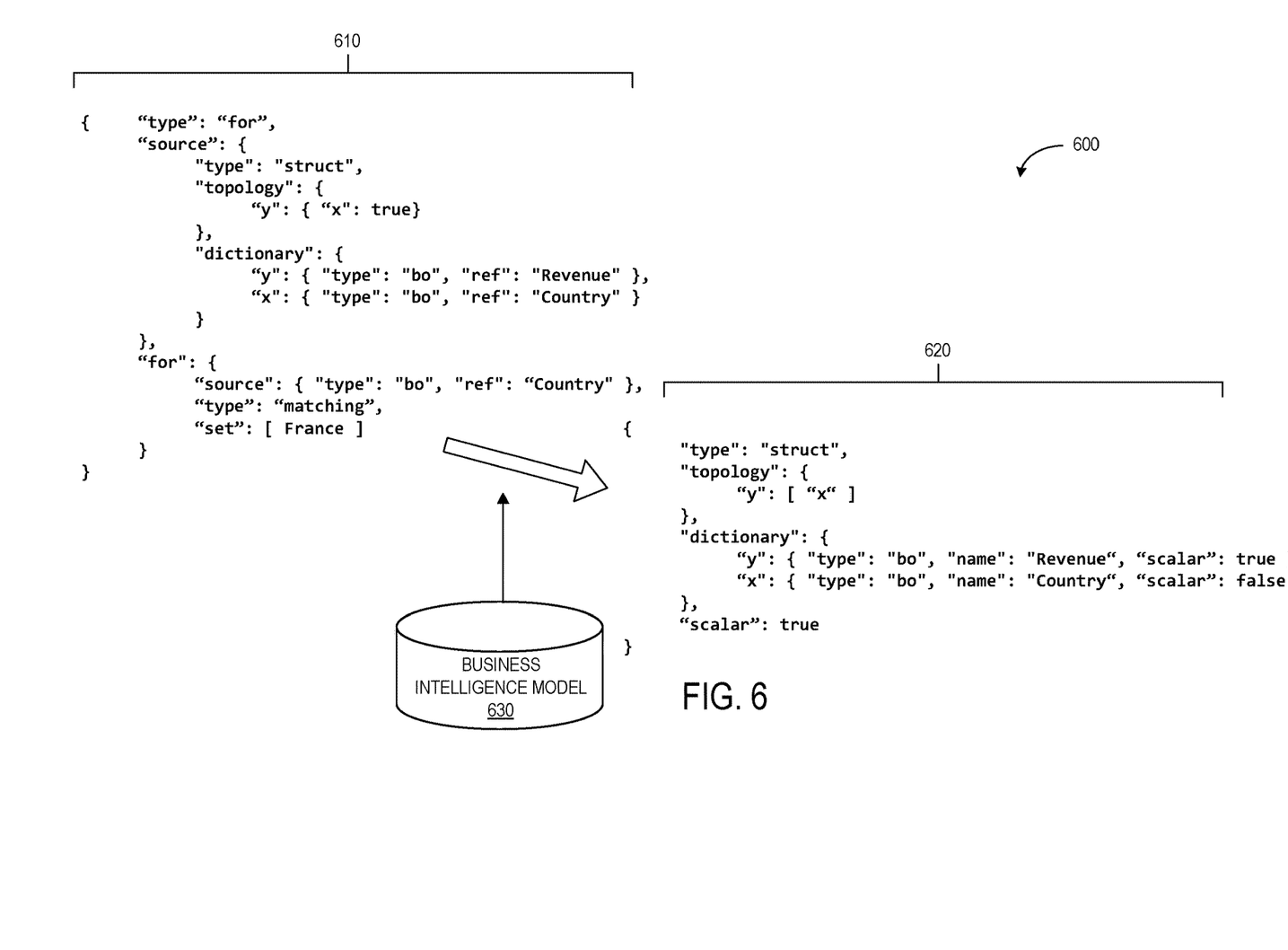
FIG. 6 illustrates output types for a business intelligence language system according to some embodiments.

FIG. 6 illustrates 600 output types for a business intelligence language system according to some embodiments. Note that a business intelligence language might expose a type system such that, for any query expression, it may be possible to compute an output type that fully describes the structure of the information computed by the expression. As illustrated in FIG. 6, information from a business intelligence model 630 may be used to help create a type entity 620 from an expression entity 610.

Figure 7:
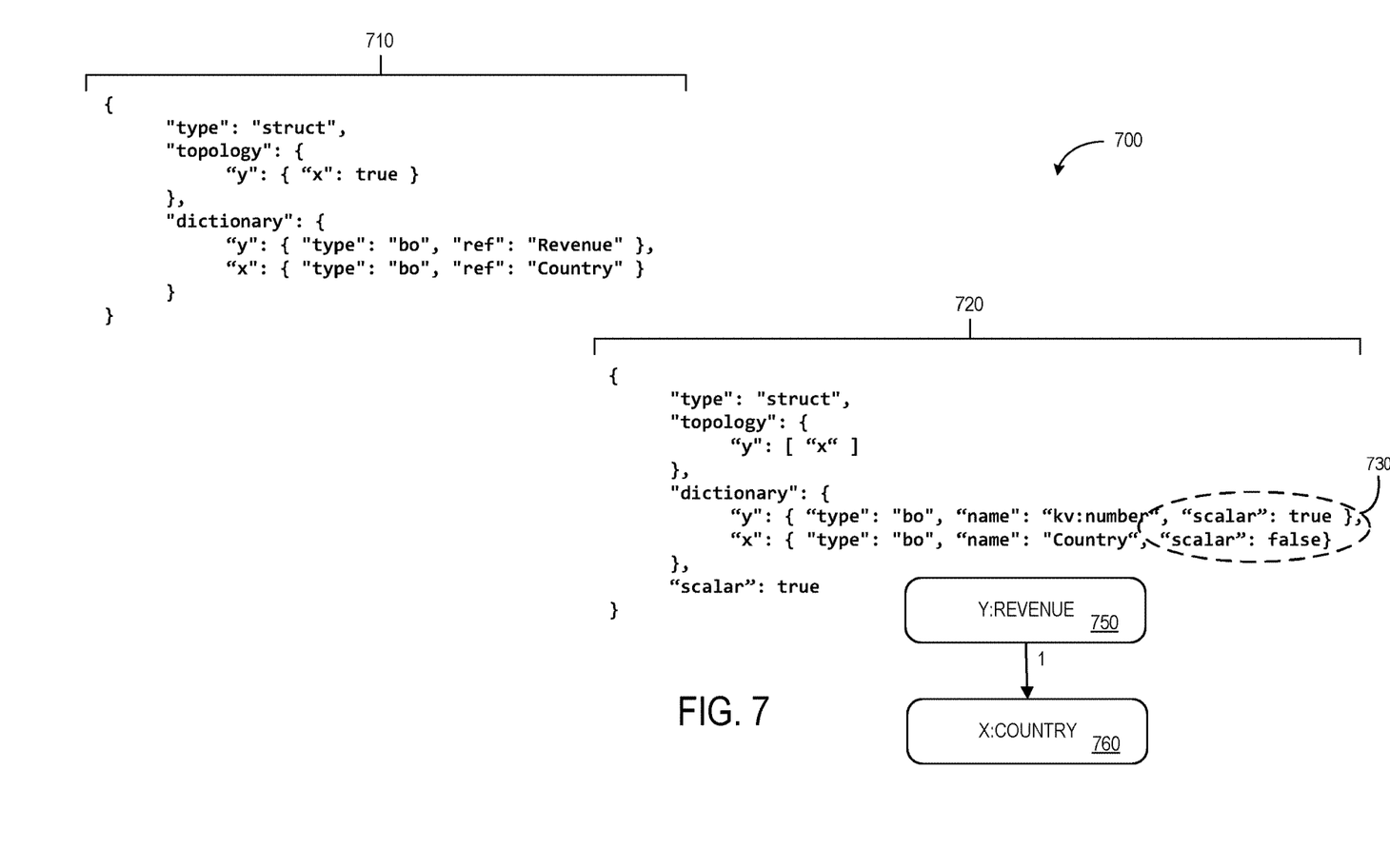
FIG. 7 illustrates a "revenue by country" output type for a business intelligence language system according to some embodiments.

By way of specific example, FIG. 7 illustrates 700 a "revenue by country" output type for a business intelligence language system according to some embodiments. Note that the expression 710 includes a "y" revenue value and an "x" country value in a dictionary portion. As a result, the type 720 also includes corresponding structures 730 to support this information. Moreover, the "y" revenue component 750 may be linked to the "x" country component 760.

Figure 8:
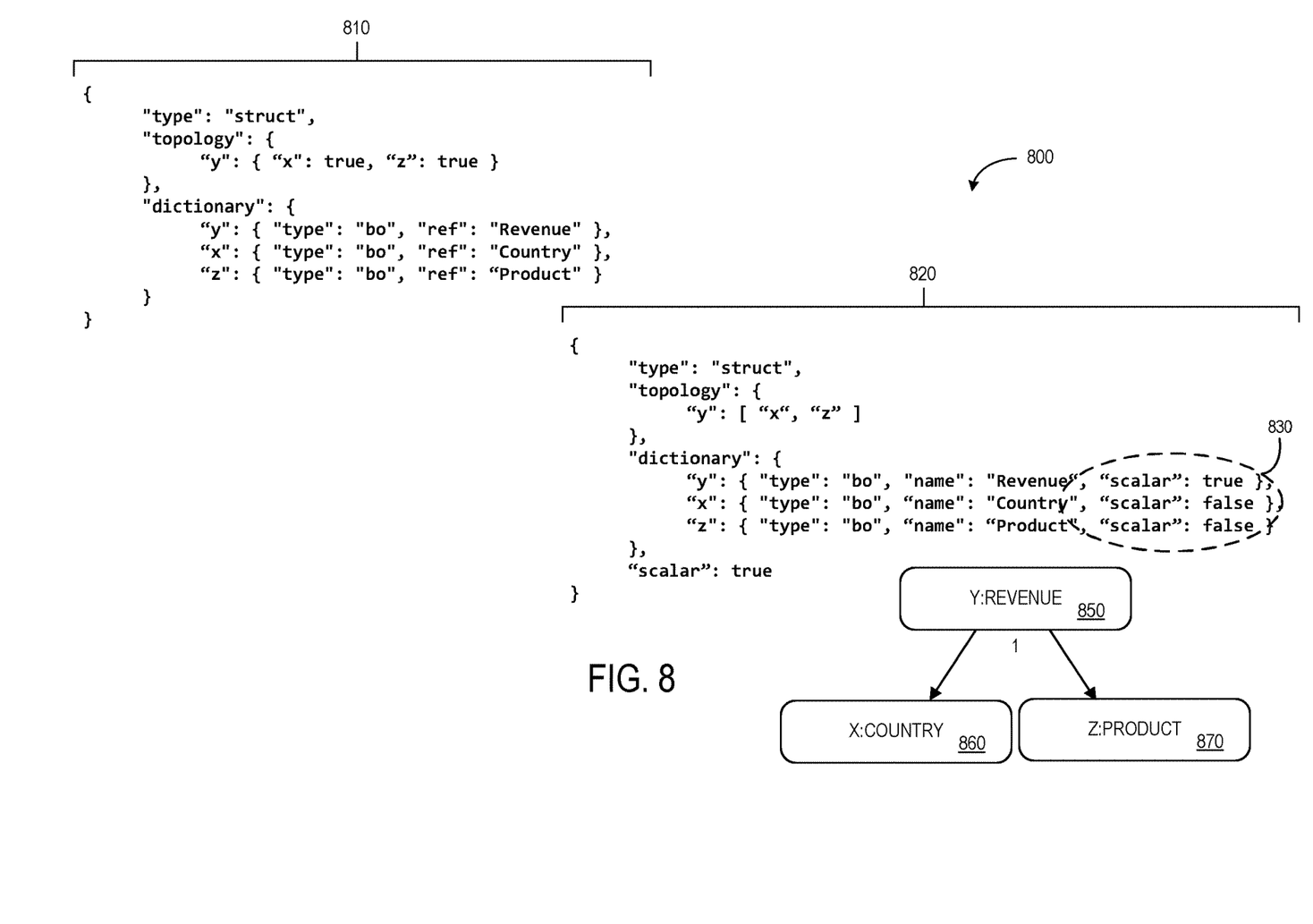
FIG. 8 illustrates a "revenue by country and product" output type for a business intelligence language system according to some embodiments.

As another example, FIG. 8 illustrates 800 a "revenue by country and product" output type for a business intelligence language system according to some embodiments. In this case, an expression 810 includes a "y" revenue value, an "x" country value, and a "z" product value in a dictionary portion. As a result, the type 820 also includes corresponding structures 830 to support this information. Moreover, the "y" revenue component 850 may be linked to booth the "x" country component 860 and the "z" product component 870.

Figure 9:
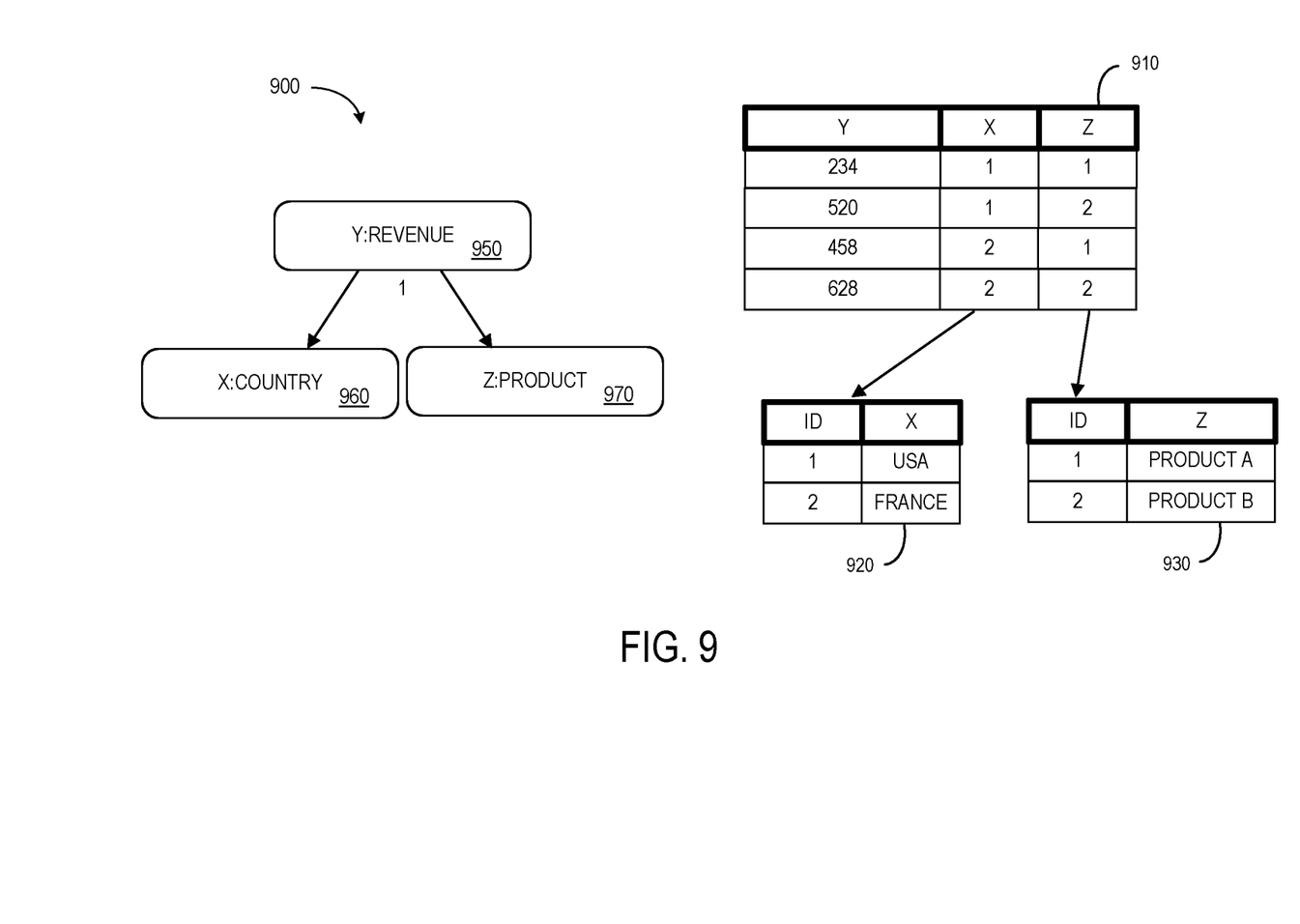
FIG. 9 illustrates an application of types associated with a result set definition for a business intelligence language system according to some embodiments.

Note that types may describe what is computed (as opposed to how a result is computed). As a result, types may be easier to understand as compared to expressions (due in part to their focus on structure). According to some embodiments, types may include information that is not directly accessible from an expression (the information may be presented in, or derivable from, a business model). FIG. 9 illustrates 900 an application of types associated with a result set definition for a business intelligence language system according to some embodiments. That is, result sets may be built from the output type. In particular, a "y" revenue component 950 may be linked to booth an "x" country component 960 and a "z" product component 970. A first table 910 might list "x" and "z" identifiers for each "y" revenue. A second table 920 might then define each "x" identifier in the first table 910 (e.g., with "2" representing "France," etc.). Similarly, a third table 930 might then define each "z" identifiers in the first table 910 (e.g., with "1" representing "Product A," etc.). Thus, data may be provided in tabular form such that a component is provided by exactly one table (although a single component might drive several different tables).

Such an approach may make consumption of business intelligence language expressions relatively straightforward. For example, charts might be automatically recommended and/or presented as an answer to a user's search query.

According to some embodiments, a "revenue and country" query might result in a map being displayed with revenue being shown for each country. A "revenue, country, and year" query, on the other hand, might result in a time line being presented to illustrate the evolution of revenue in each country over time. Note that a chart recommendation might be driven by a structure of the information (number of axes, measures, dependencies, etc.). Moreover, additional metadata might be utilized (e.g., cardinality of axes, semantics, geography, time, etc.).

Thus, embodiments may make it possible to describe unambiguous mappings between a type and different forms of result sets. Moreover, the type might be used to guide a recommendation of visualization that best represent the computed information. Note that such a process might involve understanding the structure of the computed information from the type of the expression (and then determining a most suitable chart type). According to some embodiments, decisions about axis placement (e.g., axis stacking) could be tailored to fit the structure of the computed information with the chart requirements (which might need a modification of the query expression and/or output type). Moreover, embodiments may enable a user to express and compose business questions based on a model that can be obtained from diverse technologies (relational, OLAP, etc.). In addition, embodiments may focus on making the consumption of results easier for a user (which might not be applicable with respect to other languages due to the relative lack of expressiveness).

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein.

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A business intelligence language system, comprising:
a business intelligence model data store containing semantic layer information;
a data source database;
a business intelligence language platform, coupled to the business intelligence model data store and to the data source database, configured to:
receive a selected business intelligence language query expression from a user out of a library containing a set of potential query expressions,
access the business intelligence model data store to compute an output type describing a result structure entity for the selected business intelligence language query expression without executing the selected business intelligence language query expression,
automatically calculate a recommended type of visualization chart for the selected business intelligence language query expression based on the computed output type before the selected business intelligence language query expression is executed without receiving an indication of a visualization chart type from the user, and
provide an indication of the recommended type of visualization chart to the user without executing the selected before the business intelligence language query expression;
a data model data store containing data foundation information, wherein information in the data model data store is used to determine a native query, corresponding to the selected business intelligence language query expression, that is provided to the data source database; and
a business intelligence language result set manager, coupled to the data source database, configured to:
retrieve data from the data source database responsive to the native query, and
output a business intelligence language result set, structured in accordance with the result structure entity described by the output type, to the user in response to the selected business intelligence language query expression.

2. The system of claim 1, wherein a result set is built from the output type in tabular form.

3. The system of claim 2, wherein the output type is associated with a plurality of linked type components, wherein each component is provided by a single table.

4. The system of claim 3, wherein a single component may drive several tables associated with the output type.

5. The system of claim 1, wherein the output type is associated with at least one of: (i) a named type, (ii) a structure type, (iii) a property, (iv) a primitive type, (v) a member, and (vi) an attachment.

6. The system of claim 1, wherein the automatically recommended visualization chart includes at least one of a map and a timeline.

7. The system of claim 1, wherein the automatically recommended visualization chart is based at least in part on a number of axes, a number of measures, dependencies, cardinality of axes, semantic information, geographic information, and time information.

8. The system of claim 1, wherein the output type is annotated with meta-data information about a business object.

9. The system of claim 8, wherein the annotation is associated with: (i) semantic information, (ii) a unit for a measure, (iii) a label, (iv) an identifier, (v) a location, and (vi) an axis cardinality.

10. The system of claim 1, wherein the business intelligence language is reentrant such that the received business intelligence language query expression is evaluated in a first context and uses a result of another business intelligence language query expression evaluated in a second context, possibly different than the first context.

11. A computer-implemented business intelligence language method, comprising:
- receiving, at a business intelligence language platform, a selected business intelligence language query expression from a user out of library containing a set of potential query expressions;
- accessing semantic layer information in a business intelligence model data store to compute an output type describing a result structure entity for the received selected business intelligence language query expression without executing the selected business intelligence language query expression,
- automatically calculating a recommended type of visualization chart for the selected business intelligence language query expression based on the computed output type before the selected business intelligence language query expression is executed and without receiving an indication of a visualization chart type from the user;
- providing an indication of the recommended type of visualization chart to the user without executing the selected business intelligence language query expression, wherein the indication suggests that the recommended type of visualization chart is either of a geographic map and a timeline;
- retrieving, by a business intelligence language result set manager, data from a data source database responsive to a native query, wherein the data model data store contains data foundation information, wherein information in the data model data store is used to determine the native query, corresponding to the selected business intelligence language query expression, that is provided to the data source database; and
- outputting, by the business intelligence language result set manager, a business intelligence language result set, structured in accordance with the result structure entity described by the output type, to the user in response to the selected business intelligence language query expression.

12. The method of claim 11, wherein a result set is built from the output type in tabular form.

13. The method of claim 11, wherein the output type is annotated with meta-data information about a business object and the annotation is associated with: (i) semantic information, (ii) a unit for a measure, (iii) a label, (iv) an identifier, (v) a location, and (vi) an axis cardinality.

14. A non-transitory, computer-readable medium storing program code, the program code executable by a processor of a business intelligence language platform to cause the processor to:
- receive, at a business intelligence language platform, a selected business intelligence language query expression from a user out of a library containing a set of potential query expressions;
- access semantic layer information in a business intelligence model data store to compute an output type describing a result structure entity for the selected business intelligence language query expression without executing the selected business intelligence language query expression,
- automatically calculate a recommended a type of visualization chart for the selected business intelligence language query expression, based on a number of axes, a number of measures, dependencies, cardinality of axes, semantic information, geographic information, time information, and the computed output type before the selected business intelligence language query expression is executed and without receiving an indication of a visualization chart type from the user;
- provide an indication of the recommended type of visualization chart to the user without executing the selected business intelligence language query expression, wherein the indication suggests that the recommended type of visualization chart is either of a geographic map and a timeline;
- retrieve, by a business intelligence language result set manager, data from a data source database responsive to a native query, wherein the data model data store contains data foundation information, wherein information in the data model data store is used to determine the native query, corresponding to the selected business intelligence language query expression, that is provided to the data source database; and
- output, by the business intelligence language result set manager, a business intelligence language result set, structured in accordance with the result structure entity described by the output type, to the user in response to the selected business intelligence language query expression.

15. The medium of claim 14, wherein the output type is annotated with meta-data information about a business object and the annotation is associated with: (i) semantic information, (ii) a unit for a measure, (iii) a label, (iv) an identifier, (v) a location, and (vi) an axis cardinality.

* * * * *